Figure 1:
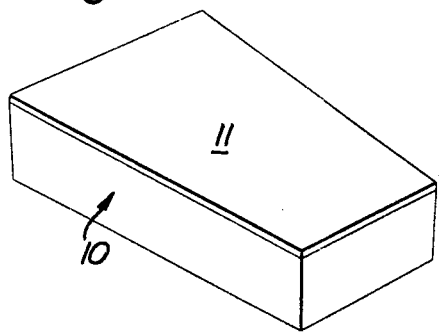
Figure 2:
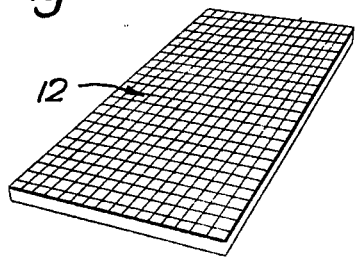
Figure 3:
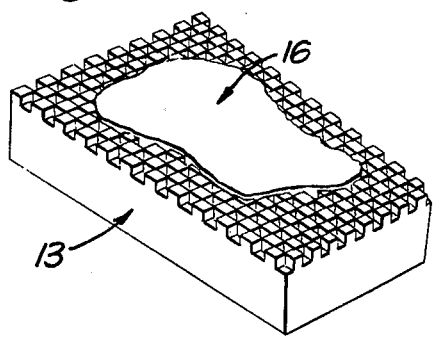
Figure 4:
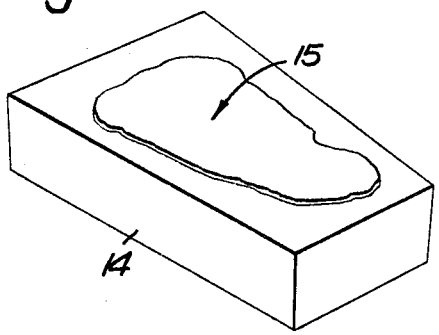
Figure 5:
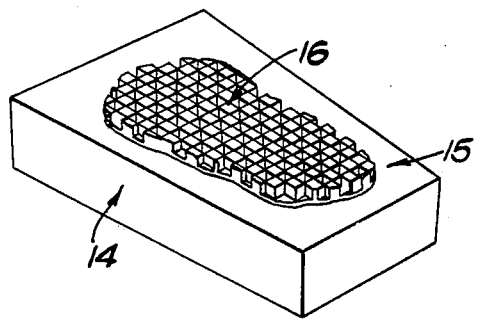
Figure 6:
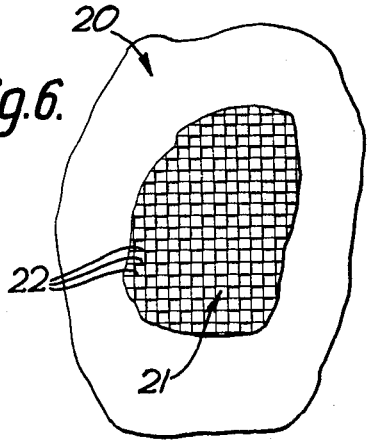

United States Patent [19]

Walker et al.

[11] 3,976,381

[45] Aug. 24, 1976

[54] METHOD OF DEFORMATION MEASUREMENT

[76] Inventors: Colin Alexander Walker, 265 Churchill Drive, Glasgow, G11 7HF; James McKelvie, 2 Waterside Gardens, Carmunnock, Glasgow, both of Scotland

[22] Filed: Jan. 20, 1975

[21] Appl. No.: 542,687

[30] Foreign Application Priority Data

Dec. 11, 1974 United Kingdom............... 53670/74

[52] U.S. Cl............................. 356/109; 356/32; 356/111; 73/88 A
[51] Int. Cl.²............................................ G01B 9/02
[58] Field of Search ............... 356/32, 109, 111, 71; 73/88 A; 33/175

[56] References Cited
UNITED STATES PATENTS

| | | | |
|---|---|---|---|
| 3,184,961 | 5/1965 | Bell...................................... | 356/32 |
| 3,563,940 | 2/1971 | Borucki............................ | 73/88 A |
| 3,604,808 | 9/1971 | Watkins........................... | 356/106 R |
| 3,865,488 | 2/1975 | Del Rio.............................. | 356/71 |

Primary Examiner—John K. Corbin
Assistant Examiner—Conrad Clark
Attorney, Agent, or Firm—Mason, Fenwick & Lawrence

[57] ABSTRACT

A method is disclosed for measuring in-plane deformation in a surface of an article, which includes attaching to the surface a grid pattern which is periodic in relief, allowing the grid pattern to become deformed and thereafter taking a cast replica of the deformed grid pattern and processing the replica under laboratory conditions to produce Moire fringes from which the deformation can be measured. The cast replica is taken by loading a rigid carrier in the form of a glass plate with a layer of silicone rubber which is a curable shape-retentive material, impressing the silicone rubber layer upon the deformed relief grid pattern and curing the silicone rubber so that the replica is a faithful and permanent reproduction of the deformed pattern.

2 Claims, 9 Drawing Figures

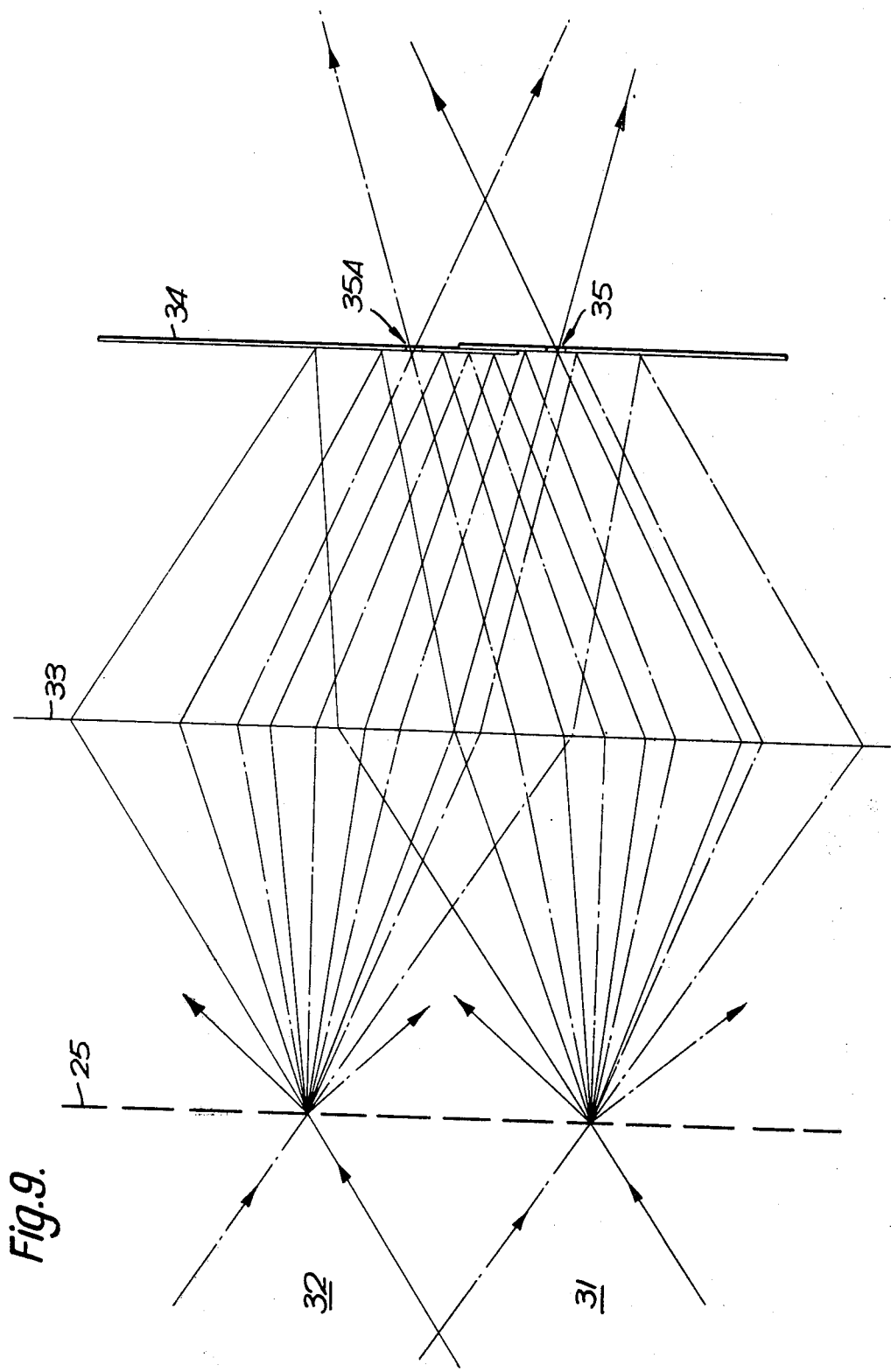

METHOD OF DEFORMATION MEASUREMENT

The present invention concerns the measurement of in-plane surface deformation of an article or structure under test, and more particularly the measurement of whole-field heterogeneous displacement patterns for the analysis of strain fields in the article or structure.

A previously known method of displacement measurement, known as the Moire' method, involves affixing a fine amplitude grating having a periodic pattern of accurately known pitch to the surface of an article, deforming the surface of the article and the grating thereon, placing a similar but undeformed fine amplitude grating, adjacent the deformed grating or an optical image thereof or a visual record thereof and observing the pattern of dark and light fringes which appear by virtue of amplitude variation in an interrogating light beam, each fringe interval corresponding to a relative displacement in the surface of the article equal to the pitch of the fine grating. With this method it is necessary, when very small displacements are being measured, to have either an extremely small grating pitch (which may be difficult to achieve accurately) or to achieve the equivalent by methods of Moire'-fringe multiplication.

There are various known methods of Moire'-fringe multiplication utilising coherent light beams and the diffraction properties of fine gratings. However, these known methods are disadvantageous in that they are limited in the sensitivity which may be achieved by virtue of the limitation on the maximum spatial frequency which an optical lens will pass, or with systems utilising high-frequency diffraction gratings, inhibited by the expense of suitable diffraction gratings, or if the deformed amplitude grating itself rather than a visual record thereof is used, application of the method is limited by virtue of the difficulty of using the expensive and delicate equipment in an on-site environment, or, if a visual record of the deformed amplitude grating is used, it is well-nigh impossible, using the methods of producing, affixing and visually recording the fine amplitude gratings as previously taught, reliably to produce a visual record which both has the diffraction properties necessary for achieving high multiplication factors and is — and remains — a faithful visual record of the deformed amplitude grating to such a degree that unquantifiable parasitic distortions are negligible when compared to the small deformations the measurement of which is the reason for utilising high multiplication factors.

An object of the present invention is to provide an improved method of measuring small in-plane relative displacements or deformation in the surface of an article or structure.

According to the present invention there is provided a method of measuring in-plane deformation in a surface of an article, comprising providing on the surface of the article to be tested a grid pattern which is periodic in relief, after deformation of the article a record of the deformed periodic pattern is made by forming a cast, the cast record is illuminated with coherent light, and two beams of light diffracted from the illuminated record and which combine are selected to give an interference pattern from which the deformation can be measured.

Figure 7:
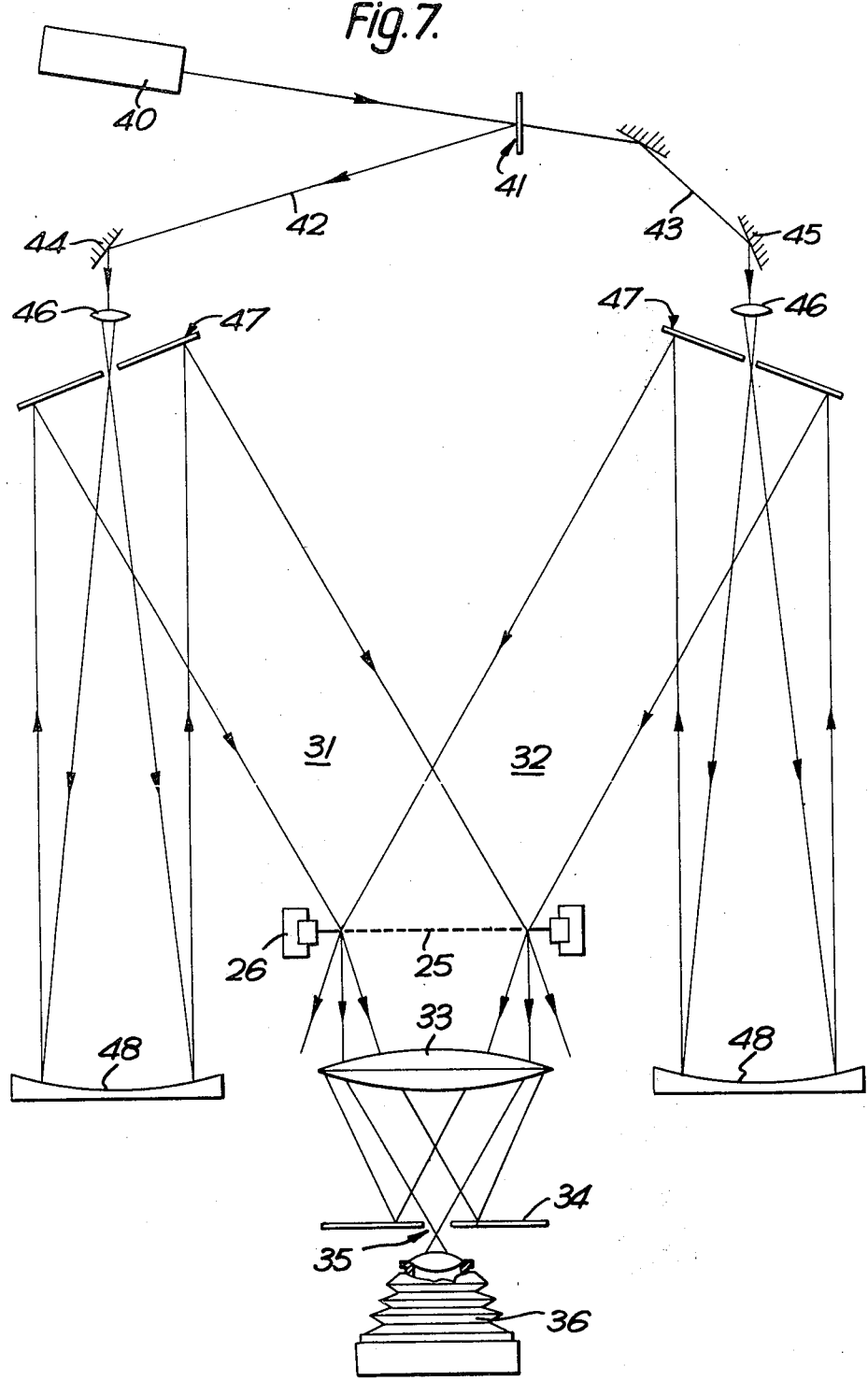
Figure 8:
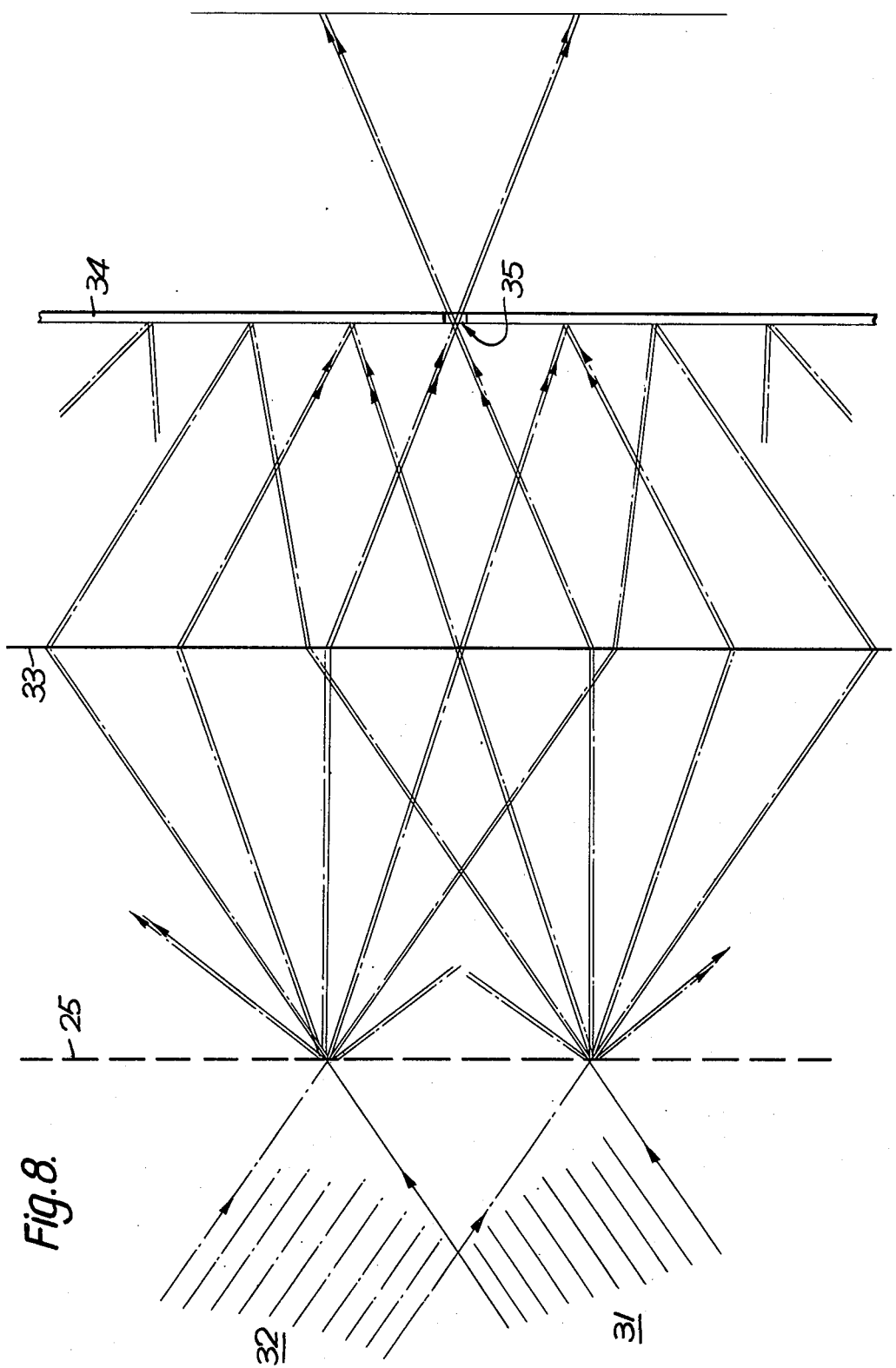

The method of the present invention will now be described in greater detail with reference to the accompanying drawings, wherein FIGS. 1 to 6 illustrate the preliminary steps of the method, and FIGS. 7, 8 and 9 illustrate the process of obtaining the interference pattern from which the deformation can be measured.

In the performance of the method according to the present invention the article or structure to be tested is initially provided with a grid pattern in relief upon an appropriate surface and in one manner of performing the method it has been found convenient to create a master grid having a grid pattern in relief and to transfer a relief-cast image of the master grid to the surface under test. Thus a glass plate 10 is first of all coated with a layer 11 of photo-resist material and a contact image of a commercially-available flat black and white crossed-grid 12 having, say 1000 marks and spaces per inch is made. Upon photographic development, a "master-grid" 13 having a relief pattern of 1000 excrescences per inch is produced. The thickness of the developed photo-resist material is preferably in the range of 0.5 to 10 micron. The master-grid 13 is now tested for its diffraction properties. It should be capable of producing diffracted orders having intensities clearly much greater than that of the surrounding "noise", up to at least the 40th order at green wavelengths. It is to be understood that a grid pattern which is periodic in relief is effective when interrogated by a coherent beam of monochromatic light to vary the phase of the light beam and consequently such grid pattern may be referred to as 'phase gratings'.

A second glass plate 14 is now thoroughly cleaned and one side of the plate 14 is coated with a solution 15 of silicone primer material in a solvent (e.g. G.E. SS9004) which is allowed to dry.

A layer 16 of degassed and solvent-free fluid transparent silicone rubber which cures slowly at room temperature and which has good release properties in the cured state (e.g. G.E. formulation 602 with catalyst concentration in the range 0.1 – 1%) is now poured over the photo-resist master-grid 13 to a depth of between 0.010 and 0.050 inches. The primed surface 15 of the second glass plate 14 is now placed over the free liquid surface of the silicone rubber layer 16 on the master-grid 13 and in contact with it — care being taken to exclude bubbles of air — and the "sandwich" left to allow the rubber layer 16 to cure (up to 24 hours at room temperature, depending upon catalyst concentration). After the cure period the photo-resist master-grid 13 is readily levered away from the cured rubber layer 16 as the cured rubber now adheres strongly to the primed surface 15 of the second glass plate 14, to leave the cured rubber layer 16 with a faithful impression of the excrescence pattern of the master-grid 13. This rubber grid hereinafter referred to as a "sub-master" is tested for diffraction properties, which should meet the same criteria as for the mastergrid. A stock of these sub-masters may be prepared from the original photo-resist master-grid.

On site, the surface 20 of the structure on which it is desired to map the strain field, is thoroughly de-scaled and cleaned, e.g. by shot blasting, and a layer 21 of a low-viscosity epoxy resin, having a thickness in the region of from 0.005 to 0.05 inches is applied. A piece of the sub-master grid is cut approximatey to the required shape and is placed on top of the liquid epoxy resin layer 21 rubber side in contact with the epoxy resin, care being taken to avoid the inclusion of air bubbles. After curing the epoxy resin (normally 24 hours), the sub-master may be readily levered away from the epoxy resin layer 21 as the cured resin adheres strongly to the surface under test, to leave a high-fidelity impression of the excrescence pattern of the sub-master-grid in the epoxy resin layer 21, thereby forming a test grid 22 on the surface 20 of the structure under test.

After this initial step has been completed deformation of the surface can be undertaken, but to provide a datum for subsequent measurement of such deformation a first impression or cast replica of the test grid on the surface of the structure under test is now made in solvent-free silicone rubber in the manner described hereinbefore for preparing the sub-master grid from the master-grid with, in this case, for convenience, a fast-curing (2 hour) formulation preferably being used. The mean ambient temperature during this cure period is noted. Preferably the cure is effected at constant ambient temperature. This first cast replica represents the unstrained surface condition of the surface under test and may be tested for diffraction properties as described above.

The structure is now loaded and second and subsequent replicas of the test grid are made when it is in various strained conditions, in the manner described hereinabove for the first cast replica, the mean ambient temperature being noted in each case.

The various cast replicas are removed from site and under laboratory conditions are individually illuminated with coherent light in order to produce Moiré fringes from which the deformation of the tested surface can be measured. Specifically, the first cast replica 25 is placed in a holder 26 forming part of an optical arrangement and is illuminated by two collimated coherent light beams 31,32 which intersect one another adjacent the plane of said replica to produce a virtual grating adjacent the cast replica 25. The light beams 31, 32 are of the same wavelength, have their axial rays lying in a plane which is perpendicular to the plane of the cast replica 25 and are incident on the cast replica at approximately equal angles of incidence thereto, whereby the cast replica 25 and the virtual grating are loated in juxtaposition to each other. In the case where the cast replica 25 is transparent, light which has been transmitted through the cast replica is passed through a convergent decollimating lens 33 which is placed in the optical arrangement with its optical axis approximately coaxial with the bisector of the angle between the two illuminating beams. Aperture means 34 having a single aperture 35 is placed in the focal plane of the decollimating lens 33 with the axis of the aperture adjacent the optical axis of the decollimating lens, to permit passage of a single diffracted order from each beam. Fringes of constant in-plane displacement component in a particular direction are thus produced in the image plane of the lens 33, the displacement fringe interval depending upon the numbers of the diffracted orders interfered, and a photograhic record of the fringe pattern is made by a camera 36.

In the case of the cast replica 25 having a perfectly uniform grid pattern, this process would produce no fringes. However, this in practice will not normally be the case, and the zero-strain apparent displacement pattern is recorded as a datum. Two further records of apparent displacement fringe pattern are now made, by rotating the cast replica 25 relative to the two beams 31,32 incident thereon, these records displaying displacement components in directions usually at 90° and 45° respectively to that of the first record. The records of apparent displacement field may now be spatially differentiated either on a point-by-point basis or by a whole-field optical method, to determine the apparent strain-field in terms of three components. The three apparent strain fields may be combined, if desired, on a point-by-point basis, using well known mathematical relationships of solid mechanics, to provide the apparent principal strains and apparent maximum shear strains in the unstrained surface.

The second and subsequent cast replicas are now subjected to the same processing as the replica 25 to provide contours of apparent principal strains and maximum shear strains in the strained surface. These methods are known in existing at and may in the point-by-point cases comprise the use of image digitising mechanisms, digital computers and digital graph-plotters. k By comparing the apparent strains in the unstrained and strained surface, and correcting for strains due to ambient temperature changes between the stages of replicating in the unstrained and strained condition and the optical processing, by means of well known mathematical relationships employing the coefficients of expansion of the material of the strained surface, and of glass, the principal strains and maximum shear strain due to other factors (e.g. loading) may be determined. Such comparison and correction may be done using the digital means previously mentioned. The temperature correction may alternatively be done by taking the displacement records with the cast replica at a temperature which is such as to nullify any temperature-induced strains.

The two collimated coherent light beams 31,32 may be produced as is shown in FIG. 7 by passing the light beam from a He—Ne laser 40 through a beam-splitter 41 to produce two beams 42,43. The beams 42,43 are then reflected from suitably placed plane mirrors 44,45 and expanded in size by identical optical systems to produce the two collimated coherent light beams 31,32 which are incident on the replica grids in the holder 26. Each optical system comprises a microscope objective 46 which expands the light beam, an apertured plane mirror 47 located adjacent the microscope objective 46 so that the divergent light beam can pass through the aperture in the mirror, and a parabolic mirror 48 arranged to produce a reflected collimated beam from the divergent beam which is incident thereon, the collimated beams being caused to intersect each other after reflection from the apertured plane mirrors 47. Each optical system is arranged such that the path length between the beam-splitter 41 and the plane of the intersection of the two beams is approximately the same, thereby producing a virtual grating at the plane of intersection of the two beams 31,32. The axial rays of the two collimated light beams 31,32 can be positioned to lie in a plane which is substantially perpendicular to the plane of the replica grid when in the holder 26 by adjusting the position of the mirrors 47,48 in each optical system relative to the illuminating beams 42,43 until the lines of the foci of the two sets of diffracted orders which may be observed on the aperture means 34 coincide and the foci of one diffracted order from one beam coincide with the foci of one diffracted order from the other beam, such that the numerical sum of the order numbers of one pair of coinciding foci is an even number and the numerical value of the order number is the same for each illuminating beam. This pair of foci is selected to pass through the aperture 35 and to be recorded by the camera 36.

The fringe pattern produced by the virtual grating and each of the replica grids is equivalent in frequency to that which would be obtained by comparing directly two grids each having initially a pitch of 1/n times the pitch of the grid 12 used to prepare the original master-grid, where n is the sum of the numerical value of order numbers of the foci not stopped at the aperture 35. If the intensities of the illuminating beams 31,32 are not approximately equal a pair of coinciding foci corresponding to numerically different diffraction orders may produce fringes of superior contrast. The pitch of the equivalent grids is not altered by so doing.

In a modification the mirrors are adjusted so that the foci of the diffracted orders from one light beam do not quite coincide with the foci of the diffracted orders of the other light beam, with the lens, aperture and camera situated as before. The Moiré fringe pattern observed in this modification corresponds to a condition of comparison of slightly mismatched grids familiar to those skilled in the art. The degree of mismatch may be calculated by removing the deformed grid and replacing it by an undeformed grid and observing the pattern of straight Moiré fringes so produced.

In a further modification the optical arrangement is identical to that described above except that the aperture means 34 has two apertures 35,35A whose distance apart is variable. In this modification the mirrors are adjusted so that the foci of the diffracted orders of one light beam are sufficiently far removed from the foci of the diffracted orders of the other light beam that an aperture is capable of permitting all the light in one diffracted order from one beam to pass to the exclusion of all the light from all other diffracted orders of both beams. The two apertures 35,35A are arranged so that one diffracted order from one light beam passes through one aperture and one diffracted order from the other light beam passes through the other aperture, to the exclusion of all other orders. The Moiré fringe pattern observed corresponds to a condition of comparison of considerably mismatched gratings familiar to those skilled in the art. The degree of mismatch may be calculated by removing the deformed grid and replacing it by an undeformed grid and observing the pattern of straight Moiré fringes so produced.

Although the foregoing description relates to the material forming the replica grids being transmissive to light it will be understood that such grids may be reflective in which case the optical arrangement of FIG. 7 would be modified to permit the lens 33 and the camera 36 to receive reflected light.

It will now be appreciated that the present invention provides a method of measuring in-plane deformation in a surface of an article or structure under test, comprising the steps of: providing a master-grid having a grid pattern in relief; making an impression of the master-grid in a solvent-free curable synthetic plastics material, thereby forming a sub-master-grid; coating the surface of the unloaded article or structure with a layer of curable resinous material; forming an impression of the sub-master-grid in the resinous material, thereby forming a test-grid on said surface which is a faithful reproduction of said master-grid; loading the article or structure; making an impression of the thus deformed test-grid in a solvent-free curable synthetic plastics material, thus forming a cast replica of the deformed test-grid; illuminating the cast replica by two collimated coherent light beams which intersect one another adjacent the plane of the cast replica, said light beams being of the same wavelength, having their axial rays lying in a plane which is substantially perpendicular to the plane of the cast replica and being incident on the cast replica at approximately equal angles of incidence thereto; passing light which has either been transmitted through or reflected from the cast replica through a decollimating lens; permitting passage of a single diffracted order from each beam, by placing aperture means in the focal plane of the decollimating lens, whereby a Moiré-fringe pattern is produced in the image plane which illustrates in-plane deformation in the surface of the article or structure; making a record of the pattern produced in the image plane; and determining the surface deformation of the article or structure from said record.

What is claimed is:
1. A method of measuring in-plane deformation in the surface of an article a structure under test, comprising the steps of providing a master-grid having a grid pattern in relief, coating the surface of the unloaded article or structure with a layer of adhesive material, transferring an impression of the master-grid to the adhesive layer, thereby forming a test-grid on said surface which is a faithful reproduction of the master-grid; loading the article or structure to deform the test-grid, making an impression of the deformed test-grid in a curable shape-retentive material and curing same thus forming a cast replica of the deformed test-grid; illuminating the cast replica with coherent light, forming an interference pattern by selecting two combining beams of light diffracted from the illuminated cast replica, making a record of said interference pattern, and determining the surface deformation of the article or structure from said record.

2. A method of measuring in-plane deformation in a surface of an article or structure under test, comprising the steps of: providing a master-grid having a grid pattern in relief; making an impression of the master-grid in a solvent-free curable synthetic plastics material, thereby forming a sub-master-grid; coating the surface of the unloaded article or structure with a layer of curable resinous material; forming an impression of the sub-master-grid in the resinous material, thereby forming a test-grid on said surface which is a faithful reproduction of said master-grid; loading the article or structure; making an impression of the thus deformed test-grid in a solvent-free curable synthetic plastics material; thus forming a cast replica of the deformed test-grid; illuminating the cast replica by two collimated coherent light beams which intersect one another adjacent the plane of the cast replica, said light beams being of the same wavelength, having their axial rays lying in a plane which is substantially perpendicular to the plane of the cast replica and being incident on the cast replica at approximately equal angles of incidence thereto; passing light which has either been transmitted through or reflected from the cast replica through a decollimating lens; permitting passage of a single diffracted order from each beam, by placing aperture means in the focal plane of the decollimating lens, whereby a Moiré-fringe pattern is produced in the image plane which illustrates in-plane deformation in the surface of the article or structure; making a record of the pattern produced in the image plane; and determining the surface deformation of the article or structure from said record.

* * * * *